United States Patent [19]
Liebermann

[11] Patent Number: 5,941,752
[45] Date of Patent: Aug. 24, 1999

[54] INFLATABLE ENCLOSURE HAVING DISCRETE CHAMBERS THEREIN

[76] Inventor: Ron B. Liebermann, 2805 Lime Kiln La., Louisville, Ky. 40222

[21] Appl. No.: 08/960,785

[22] Filed: Oct. 30, 1997

[51] Int. Cl.⁶ .............................. A63H 3/06; B63B 22/22; B63B 9/125
[52] U.S. Cl. ................ 446/220; 441/31; 441/98
[58] Field of Search ...................... 446/220, 221, 446/222, 224; 441/30, 31, 98, 99, 101

[56] References Cited

U.S. PATENT DOCUMENTS

| | | |
|---|---|---|
| 1,247,809 | 11/1917 | Foster . |
| 1,771,730 | 7/1930 | Marcks . |
| 3,310,024 | 3/1967 | McConnell . |
| 3,786,590 | 1/1974 | Weeks . |
| 4,781,645 | 11/1988 | Kato . |
| 4,929,214 | 5/1990 | Liebermann . |
| 5,083,961 | 1/1992 | Ishiwa ................... 446/20 X |
| 5,098,095 | 3/1992 | Weiss .................... 446/224 X |
| 5,188,558 | 2/1993 | Barton et al. ............ 446/224 |
| 5,279,873 | 1/1994 | Oike .................... 446/220 X |
| 5,480,339 | 1/1996 | Wu ....................... 446/220 |

*Primary Examiner*—D Neal Muir
*Attorney, Agent, or Firm*—Middleton & Reutlinger; John F. Salazer

[57] ABSTRACT

A self-inflating enclosure providing a fracturable first envelope; a first reactive component contained within the first envelope, the first reactive component being fluid; a second envelope having at least one self-sealing aperture therethrough, the first envelope being contained within the second envelope, the first envelope being in fluid communication with the second envelope upon fracturing of the first envelope, the first reactive component being dischargeable into the second envelope upon fracturing of the first envelope; a second reactive component contained within the second envelope, the second reactive component being reactable with the first reactive component to generate a gas; and, a third envelope, the second envelope being contained within the third envelope, the third envelope being in gas communication with the said second envelope only during the second envelope having a predetermined internal pressure, the gas being dischargeable into the third envelope only upon the second envelope having the predetermined internal pressure.

12 Claims, 2 Drawing Sheets

INFLATABLE ENCLOSURE HAVING DISCRETE CHAMBERS THEREIN

BACKGROUND OF THE INVENTION

1. Technical Field of the Invention

The present invention relates to self-inflating enclosures, such as balloons and the like. More particularly, the present invention relates to a self-inflating enclosure, such as a balloon or the like, wherein the self-inflating enclosure is inflatable through a chemical reaction between at least two reactive components and wherein the self-inflating enclosure is provided with discreet chambers for separating the products of the chemical reaction.

2. Discussion of the Prior Art

Various self-inflating enclosures, such as balloons and the like, are known in the prior art. One such known inflatable enclosure is illustrated in U.S. Pat. No. 1,247,809 Foster which shows an inflatable balloon structure having an inflation neck connected to a gas generator. This old gas generator includes a first cylindrical tube, open at both of its ends, and containing a material, such as carbide, which forms a gas when contacted with water. A second open-ended tube is imbedded within the carbide and contains water. The open ends of the second tube are sealed with wax plugs. Water entering the outer tube, through the open ends thereof, initiates the formation of gas and generates sufficient heat to melt the wax plugs, closing the ends of the second tube, which permits the water inside the second tube to exit from the inner tube into the outer tube to complete the gas generation by reacting with the carbide in the outer tube. The gas passes through the inflation neck and into the balloon to inflate the same.

U.S. Pat. No. 1,771,730 Marcks shows an inflatable flotation bag, fabricated of a water permeable, elastic flexible material, such as linen and containing a small charge of gas producing chemicals, such as powdered citric acid, tartaric acid, or an acetate and sodium bicarbonate. When the water permeable bag is immersed in water, the water enters the bag causing a chemical reaction with the gas producing chemicals therein, which, in turn, inflates the bag. The water also causes the permeable bag material to swell, closing the permeable bag material, to form an impervious bag.

U.S. Pat. No. 3,310,024 McConnell illustrates a signal balloon having an inflation neck connected to a compressed gas cylinder. This old signal balloon has a check valve and a pointed needle for piercing the gas cylinder. When the gas cylinder is attached to the inflation neck, the needle pierces the gas cylinder, thus releasing pressurized gas into the balloon. The check valve prevents the back flow of gas from the balloon.

U.S. Pat. No. 3,786,590 Weeks shows a flotation device to be attached to, for example, a fishing rod, to prevent it from sinking, if dropped into the water. The flotation device includes a plastic cylinder containing a gas producing chemical, such as calcium carbide. One end wall of the cylinder has an opening for water to enter the cylinder. The other end wall of the cylinder has an opening for the egress of gas. A balloon has a filling neck attached to the cylinder at the gas egress end. A check valve is located at the gas egress opening of the cylinder to prevent gas from flowing out of the balloon. The cylinder is attached to the fishing rod by clamps. If the fishing rod is dropped into the water, the water will enter the cylinder, creating a gas upon reaction with the calcium carbide inside the cylinder, that inflates the balloon and, thus, prevents the fishing rod from sinking. However, the aforementioned prior-art inflatable enclosures are complicated in structure and, hence, expensive to manufacture.

U.S. Pat. No. 4,929,214 to Liebermann teaches an inflatable enclosure and means to inflate same wherein a first enclosure is formed from a fluid-impermeable polymer and contains a predetermined quantity of citric acid therein, and wherein the first enclosure is surrounded by a second enclosure in liquid-communication therewith and wherein the second enclosure is formed from a gas-permeable porous material, such as, for example, calendared, bonded or random-laid fiber, and wherein the second enclosure includes a predetermined quantity of sodium bicarbonate provided therein. The second enclosure is sealingly surrounded by a third enclosure having a graphical image or other indicia provided on an outer surface thereof. Inflation of the self-inflating enclosure is accomplished by a user's fracturing the first enclosure (such as by squeezing through the second and third enclosures), thereby permitting the citric acid provided therein to mix with the sodium bicarbonate and thereby generating carbon dioxide gas through a chemical reaction therewith. The carbon dioxide gas permeates through the second enclosure and into the third enclosure, thereby inflating same. However, the porous second enclosure oftentimes permits the citric acid to likewise permeate through the second enclosure, creating a likelihood that the citric acid may leak or otherwise escape from the third enclosure or that the carbon dioxide gas may dissolve back into the citric acid with which it is permitted to commingle within the third enclosure, thereby deflating the self-inflating enclosure. It is therefore desirable to provide a self-inflating enclosure being inflatable through a chemical reaction between at least two reactive components and wherein the self-inflating enclosure is provided with discreet chambers for separating the products of the chemical reaction.

U.S. Pat. No. 4,781,645 to Kato teaches an inflatable bag having a rupturable sack disposed therein wherein the inflatable bag contains sodium bicarbonate and an externally-breakable container filled with an acidic solution and wherein breaking the container causes the acidic solution to mix with the sodium bicarbonate, thereby creating carbon dioxide gas and inflating the innermost sack until the innermost sack is punctured under the pressure being accumulated therein. However, the carbon dioxide is permitted to mix with the acidic solution, and likely dissolve therein, deflating the bag.

SUMMARY OF THE INVENTION

It is an object of the present invention to provide a self-inflating enclosure wherein the self-inflating enclosure is inflatable through a chemical reaction between at least two reactive components provided therein and wherein the self-inflating enclosure is provided with discreet chambers for separating the products of the chemical reaction.

A self-inflating enclosure according to a preferred embodiment of the present invention includes a fracturable first envelope; a first reactive component contained within the first envelope, the first reactive component being fluid; a second envelope having at least one self-sealing aperture therethrough, the first envelope being contained within the second envelope, the first envelope being in fluid communication with the second envelope upon fracturing of the first envelope, the first reactive component being dischargeable into the second envelope upon fracturing of the first envelope; a second reactive component contained within the second envelope, the second reactive component being reactable with the first reactive component to generate a gas; and, a third envelope, the second envelope being contained within the third envelope, the third envelope being in gas communication with the second envelope only during the second envelope having a predetermined internal pressure, the gas being dischargeable into the third envelope only upon the second envelope having the predetermined internal pressure.

BRIEF DESCRIPTION OF THE DRAWINGS

A better understanding of the present invention will be had upon reference to the following description in conjunction with the accompanying drawings in which like numerals refer to like parts, and wherein.

DETAILED DESCRIPTION OF THE PREFERRED EMBODIMENT

Figure 1:
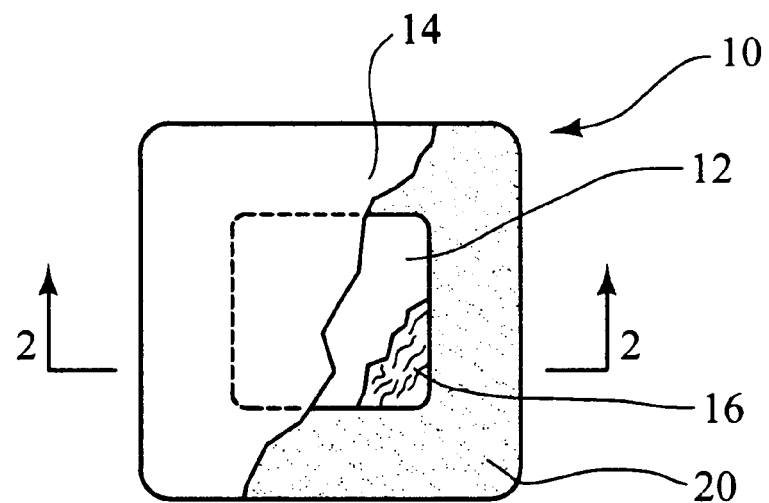
FIG. 1 is a top view of a self-inflating enclosure according to a preferred embodiment of the present invention.
Figure 2:
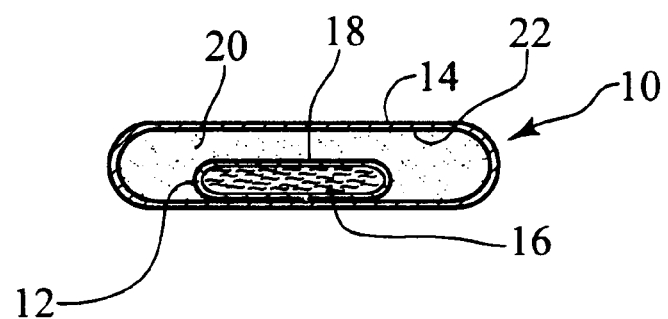
FIG. 2 is a cross-sectional side view of the self-inflating device of FIG. 1 as seen in the direction of arrows 2—2 of FIG. 1.
Figure 3:
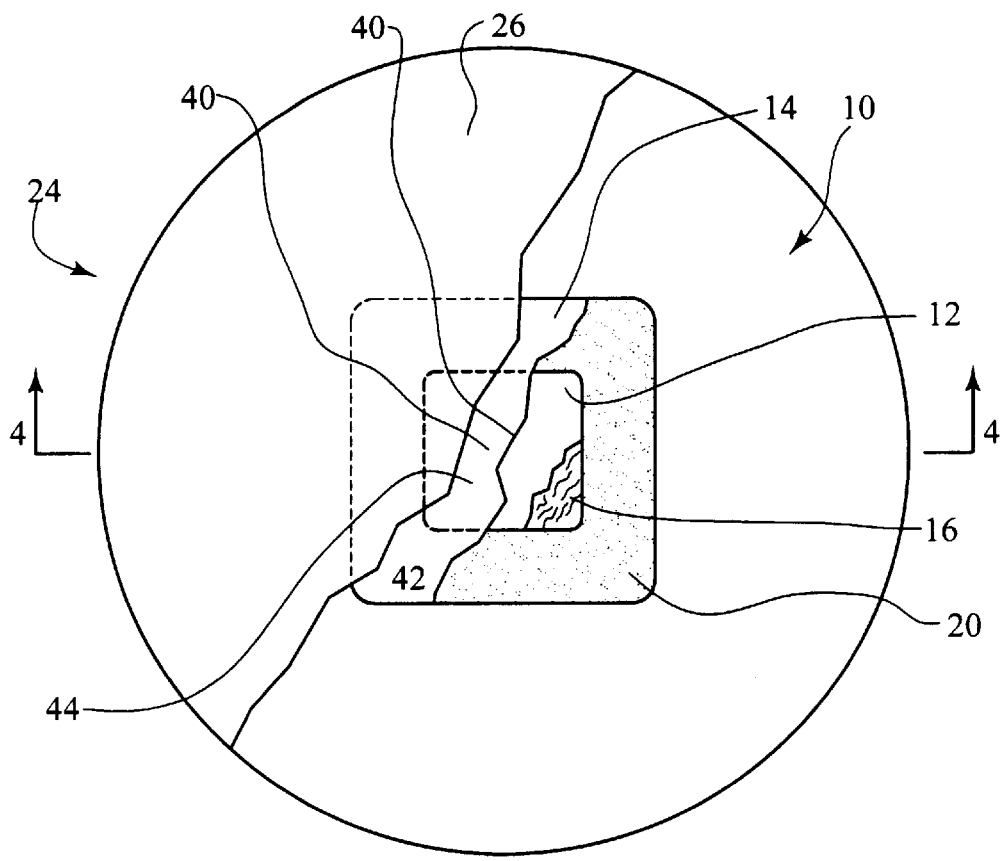
FIG. 3 is a plan view of the self-inflating enclosure of FIG. 1, partially cut away to show internal details; and, FIG. 4 is a cross-sectional side view of the self-inflating enclosure of FIG. 3 as seen in the direction of arrows 4—4 of FIG. 3.
Figure 4:
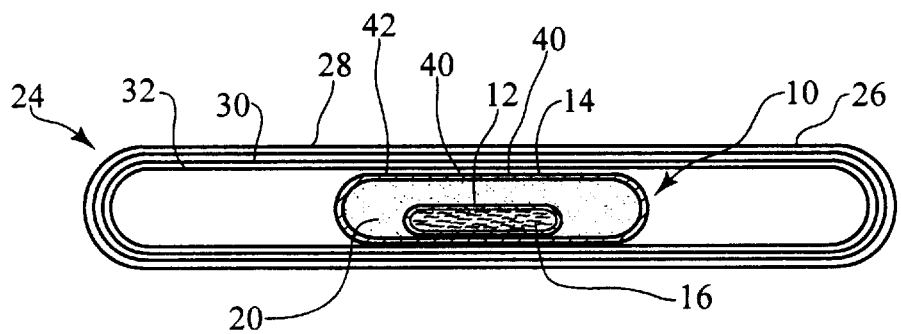

With reference to FIGS. 1 and 2, there is shown a self-inflating device 10 according to a preferred embodiment of the present invention which can, by itself, comprise a self-inflating enclosure, or, alternatively, can comprise an inflating device to be located within and surrounded by an inflatable outer envelope 26 (as shown in FIGS. 3 and 4) for generating a gas to inflate the outer envelope 26 of another form of inflatable enclosure 24.

The device 10 comprises a fracturable first closed envelope 12 that is in fluid-communication with a second envelope 14 upon fracture of the first envelope 12. As illustrated, the first envelope 12 is smaller in physical size than the second envelope 14 and is enclosed thereby. The first envelope 12 can be located at a fixed position within the second envelope 14 by, for example, adhesively connecting the first envelope 12 to an interior surface of the second envelope 14 at a convenient location, such as a geometric center of the second envelope 14.

The device 10 further includes a multi-component gas generating chemical system. The gas generating chemical system includes at least two components 16 and 20, with a first component 16 being in solution, and a second component 20 being in solid form, such as a powder or tablet. Each of the reactive components 16 and 20 is non-toxic and a gas generated by their reaction is also non-toxic. The elements of the gas generating system can include, for example, three elements, e.g., a weak acid, a base, and water combined in different combinations. For example, a first reactive component 16 of the gas generating system can be water and a second reactive component 20 can be a combination of a weak acid and base, in solid form; or one reactive component can be a weak acid in solution and the other reactive component can be a base in solid form; or one reactive component can be a base in solution and the other component can be an acid in solid form. A suitable acid is lemon juice and citric acid or other suitable acid, and a suitable base is sodium bicarbonate.

With continued reference to FIGS. 1 and 2, the fracturable first envelope 12 is fabricated from a fluid-impermeable material that is breakable, burstable, frangible, or otherwise fracturable, such as, for example, a 1.5–2.0 mil thick film of low density polyethylene or ethylene copolymer such as ethylene vinyl acetate. The first envelope preferably includes a tensile strength of less than 4000 psi and an Elmenfdorf tear rating of less than 400 grams. One of the reactive components, although preferably the liquid component, of the gas generating chemical system, denoted generally as numeral 16, is contained within and enclosed by the first envelope 12.

As further illustrated in the Figures, the second envelope 14 encloses the first envelope 12 and is in fluid-communication therewith upon fracture thereof. The second envelope 14 is fabricated from a fluid-impermeable material, such as, for example, a coextruded film of nylon and low density polyethylene, wherein ethylene vinyl acetate is preferably used as a bonding agent therebetween. However, additional embodiments of the present invention include a second envelope 14 having a coextrusion of polyethylene and ethylene vinyl acetate; of low density polyethylene, ethylene vinyl acetate and high density polyethylene; or of polyethylene and metalized polyethylene terephthalate. The second envelope 14 is preferably a 0.0025 mil thick film and is sufficiently strong to withstand an explosive force of the type typically associated with the fracture of the first envelope 12.

A second of the reactive components of the gas generating chemical system, generally denoted as the numeral 20, is contained within and enclosed by the second envelope 14. This second reactive component 20 can be either the solution or the solid component.

As described above, the inflating device 10 is, by itself, a self-inflating enclosure. When it is desired to inflate the inflating device 10, a user need only apply a sufficient force, such as, for example, by squeezing, thereto to cause the first envelope 12 to burst or break, releasing the first reactive component 16 of the gas generating system contained therein, so that it contacts the second reactive component 20 contained in the second envelope 14. A user can accomplish this by applying a pressure with his hands or fingers to an exterior surface of the second envelope 14 and against the first envelope 12, disposed therein. The inflating gas generated thereby inflates the second envelope 14, within which the gas, the residual reactive components 16 and 20, as well as all other products of the chemical reaction therebetween accumulate.

With reference to FIGS. 3 and 4, there is shown an inflatable enclosure 24 according to a preferred embodiment of the present invention, such as a balloon or the like, that can have a variety of end-uses such as, for example, an inflatable toy, novelty item, promotional product or flotation device such as a life preserver or raft. As illustrated, the inflatable enclosure 24 includes the aforedescribed device 10, surrounded by and enclosed within a third or outer envelope 26, which is to be inflated by the non-toxic gas generated by the reaction of the components 16 and 20 of the gas generating chemical system. The second envelope 14 of the inflating device 10 is smaller in size than and is enclosed within and surrounded by the third or outer envelope 26 and can be located at a fixed position within the third envelope 26 by, for example, adhesively connecting the second envelope 14 to the interior surface of the third envelope 26 at a convenient location therein.

To permit the gas generated by the chemical reaction between the reactive components 16 and 20 to escape the second envelope 14 and inflate the third or outer envelope 26, at least one microperforation 40 having a diameter less than 1 mm is provided through an upper portion 42 of the second envelope 14 towards a center region 44 thereof. In the preferred embodiment, two microperforations 40 are provided, as illustrated in the Figures. The at least one microperforation 40 is self-sealing and is normally closed, thereby sealing the second envelope 14 and preventing escape of either the reactive components 16 and 20 therefrom prior to inflation.

The third or outer envelope 26 is preferably heart-shaped or round and is fabricated of a fluid-impermeable material, which is also non-hydroscopic, so that it will not deteriorate when contacted with water. Various materials have been found suitable for the third envelope 26. Such materials include, for example, "Mylar" sold by Dupont which is a metalized polyester, vinyl film, polyethylene-paper colaminates, polyethylene-foil, polyethylene-cellulose, and biaxially oriented nylon. Biaxially oriented nylon is preferred, because it does not have a "grain" and, therefore, has a high resistance to stretching in both directions. The biaxially oriented nylon of the third or outer envelope 26 includes a layer 28 of aluminum film bonded to the biaxially oriented nylon 30 on the exterior of the third envelope 26 and a layer 32 of polyethylene bonded to the biaxially oriented nylon 30 on the interior of the third envelope 26. The layer of aluminum film 28 provides a gas barrier and, also, a highly reflective surface, which highlights graphics printed thereon.

Prior to being inflated, the inflatable enclosure 24 can be folded to provide a small package capable of being easily stored or carried, such as, for example, when packaged within an additional enclosure such as a greeting card. When it is desired to inflate the inflatable enclosure 24, a user need only apply a sufficient force, such as, for example, by squeezing, to the inflating device 10 to cause the first envelope 12 to burst or break, releasing the first reactive component 16 of the gas generating system contained therein, so that it contacts the second reactive component 20 contained in the second envelope 14. A user can accomplish this by applying a pressure with his hands or fingers to an exterior surface of the third or outer envelope 26 and against the first envelope 12. The inflating gas thus generated accumulates within the second envelope 14 until an internal pressure therein caused by such accumulation exceeds a pressure within a region between the second envelope 14 and the third envelope 26. The at least one microperforation 40 prevents escape of the gas prior to such pressure is achieved, at which point, the at least one microperforation 40 opens under the influence of the pressure within the second envelope 14, thereby permitting the inflating gas to be discharged through the at least once microperforation 40 of the second envelope 14, and into the third envelope 26.

During the period when the gas is being discharged through the at least one microperforation 40, the greater internal pressure within the second envelope 14 as compared to the third envelope 26 causes the second envelope 14 to "pillow" outwardly, thereby raising the at least one microperforation 40 substantially above the reactive components 16 and 20 pooled at a lower portion of the second envelope 14, thereby preventing the discharge of anything other than the gas from the second envelope 14 and separating the reactive components 16 and 20 from the gas. Once the pressures between the second envelope 14 and the third envelope 26 reach equilibrium, the at least one microperforation 40 returns to the normally sealed position, thereby retaining all products of the chemical reaction (except the gas) therein. Because the gas is separated from the liquid reactive component 20, the gas is not dissolvable therein, which permits the inflatable enclosure 24 to retain a "fully infated" appearance for a longer period of time. Even further, because the liquid reactive component 20 is retained within the second envelope 14, puncture of the third envelope 26 will not result in spillage of any of the reactive components. Even further, the speed of the chemical reaction between the reactive components 16 and 20 is increased due to the fact that the reactive components 16 and 20 are prevented from being separated during reaction.

In an alternative embodiment of the present invention, a small quantity of micro-encapsulated, super-absorbent, gel-forming powder is disbursed through the solid reactive component 20 to absorb the liquid product of the chemical reaction of the solid reactive component 20 with the liquid reactive component 16. The particular gel-forming powder chosen should permit the complete reaction between the reactive components 16 and 20 prior to forming the gel.

A preferred method for making an inflatable device 10 as hereinabove described includes the steps of forming the first envelope 12 from a first continuous web of film material on a first vertical form-fill seal forming machine, depositing a predetermined quantity of citric acid and lemon juice 16 therein before sealing same, imparting at least one microperforation 40 into a second continuous web of film material, forming the second envelope 14 from the second web of film material on a second form-fill seal forming machine, conveying the first envelope 12 to and depositing same within the partially-formed second envelope 14, conveying a measured quantity of sodium bicarbonate 20 to and depositing same within the partially-formed second envelope 14, and sealing the second envelope 14.

The first vertical form-fill seal forming machine is provided with low durometer teflon-coated heat seal jaws capable of producing a hermetic, fluid-impermeable seal to the first envelope 12. Further, the first vertical form-fill seal forming machine is mounted directly above the second form-fill seal forming machine and is electronically synchronized by a programmable logic controller so that forming the first envelope 12 precedes forming of the second envelope 14 by approximately 0.3 to 0.8 seconds.

A pneumatically-actuated micro-perforating die is provided to impart the at least one microperforation 40 into the second web of film material and is located relative to the second form-fill seal forming machine such that the at least one microperforation 40 is imparted to the second web of film material immediately prior to partially forming the second envelope 14. A closed-loop film feed drive motor is provided to place the at least one microperforation 40 in a center region 44 of the upper portion 42 only of the second envelope 14.

The inflatable device 10 is conveyed from the second form-fill seal forming machine to a belt-driven horizontal heat sealing and heat cutting machine, wherein the third envelope 26 is formed from two opposing continuous webs of film material, between which the inflatable device 10 is inserted, whereafter the two opposing films are brought in abutting relationship and sealed together along an outer periphery thereof.

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the disclosure. Accordingly, modifications are contemplated which can be made without departing from either the spirit or the scope of the present invention as described hereinabove.

I claim:

1. An inflatable enclosure, comprising:

a fracturable first envelope;

a first reactive component contained with said first envelope, said first reactive components being fluid;

a second envelope having at least one self-sealing aperture therethrough, said first envelope being contained within said second envelope, said first envelope being in fluid communication with said second envelope upon fracturing of said first envelope, said first reactive component being dischargeable into said second envelope upon fracturing of said first envelope;

a second reactive component contained within said second envelope, said second reactive component being reactable with said first reactive component to generate a gas;

a third envelope, said second envelope being contained within said third envelope, said third envelope being in gas communication with said second envelope only during said second envelope having a predetermined internal pressure, said gas being dischargeable into said third envelope only upon said second envelope having said predetermined internal pressure, said at least one self-sealing aperture being vertically above said first and second reactive components during said gas being discharged into said third envelope; and, a superabsorbent material disbursed through one of said first and second reactive components, said superabsorbent material forming a gel with said first and second reactive components.

2. The inflatable enclosure of claim 1, wherein: said third envelope is fabricated from stretch-resistant material.

3. The inflatable enclosure of claim 1, wherein: said third envelope is fabricated from water-resistant material.

4. The inflatable enclosure of claim 1, wherein: said first reactive component is non-toxic; said second reactive component is non-toxic; and, said gas is non-toxic.

5. The inflatable enclosure of claim 4, wherein:

one of said first and said second reactive components is an acid; and, one of said first and said second reactive components is a base.

6. The inflatable enclosure of claim 5, wherein:

said acid is lemon juice and citric acid; and, said base is sodium bicarbonate.

7. The inflatable enclosure of claim 5, wherein:

said acid is citric acid; and, said base is sodium bicarbonate.

8. The inflatable enclosure of claim 1, wherein: said second envelope is fabricated from a coextruded film having a first polymer and a second polymer.

9. The inflatable enclosure of claim 7, wherein:

said first polymer is nylon; and, said second polymer is low density polyethylene.

10. The inflatable enclosure of claim 7, wherein:

said first polymer is high density polyethylene; and, said second polymer is low density polyethylene.

11. The inflatable enclosure of claim 1, wherein:

said superabsorbent material is a powder.

12. The inflatable enclosure of claim 1, wherein:

said gel forms only upon said third envelope having said predetermined internal pressure.

* * * * *